United States Patent

[11] 3,615,667

| [72] | Inventor | Frederick M. Joffe |
| | | Wyoming, Ohio |
| [21] | Appl. No. | 30,246 |
| [22] | Filed | Apr. 20, 1970 |
| [45] | Patented | Oct. 26, 1971 |
| [73] | Assignee | The Procter & Gamble Company |
| | | Cincinnati, Ohio |
| | | Continuation-in-part of application Ser. No. 823,954, May 12, 1969, now abandoned. |

[54] FLAKED COFFEE AND PRODUCTS PRODUCED THEREFROM
46 Claims, No Drawings

[52] U.S. Cl. ................................................. 99/68, 99/69
[51] Int. Cl. ................................................. A23f 1/02, A23f 1/06, A23f 1/10
[50] Field of Search ........................................ 99/65, 68, 71

[56] References Cited

UNITED STATES PATENTS

| 1,903,362 | 4/1933 | McKinnis | 99/65 |
| 2,123,207 | 7/1938 | Rosenthal | 99/65 |
| 2,281,320 | 4/1942 | Odell, Jr. | 99/68 |
| 2,368,113 | 1/1945 | Carter | 99/71 |

*Primary Examiner*—Frank W. Lutter
*Assistant Examiner*—William L. Mentlik
*Attorneys*—Edmund J. Sease and Richard C. Witte

ABSTRACT: Flaking of roast and ground coffee can be used advantageously to control or regulate the flavor and aroma of coffee as well as the extractability. Utilizing the varying effect of flaking on high, low, and intermediate grade coffees, an improved roast coffee product comprising as a major portion low and/or intermediate grade flaked coffees, and as a minor portion high-grade roasted and ground coffee, is prepared. Also disclosed are flakes having particularly desirable physical properties.

FLAKED COFFEE AND PRODUCTS PRODUCED THEREFROM

This application is a continuation-in-part of my previously filed application, Ser. No. 823,954, filed May 12, 1969 and entitled "A FLAKED COFFEE PRODUCT."

BACKGROUND OF THE INVENTION

Roast and ground coffee products presently available in the market place comprise various blends of differing grades of coffees. The differing grades of coffees are classified in the art as "low," "intermediate," and "high." These terms, i.e. low, intermediate, and high, define three distinct classes of coffees, each having its own characteristic properties. For example in regard to natural flavor and aroma, low grade coffees such as Robustas and others enumerated hereinafter are often characterized as "dirty," "earthy," "rubbery," "fermented," "musty," and "strong, pungent and bitter." Intermediate grade coffees such as Brazilian coffees, African naturals and others detailed hereinafter, are characterized in terms of natural flavor and aroma as "bland," "neutral," "lacking in aromatic and high grown notes." "sweet," and "not offensive." High grown coffee such as good quality Arabicas and Colombians, are characterized in terms of natural flavor and aroma as having "excellent body" "acid," "fragrant," "thin," "aromatic" and occasionally "chocolatey." For details in regard to definitions of these natural flavor and aroma characterization phases, see Sivetz, Coffee Processing Technology, Vol. 1 published in 1963 by Avi Publishing Company, at pages 173 through 175.

As previously mentioned, consumer-acceptable roast and ground coffees generally comprise a blend of all three classes of coffees. Blending is utilized to emphasize the desirable characteristics of each grade of coffees. For example, some strong body notes characteristic of low grade coffees are desirable as well as some fragrant and aromatic notes characteristic of high grown coffees. Intermediate grade quality coffees typically contribute to overall taste impact and body of the coffee. Because the most desirable flavor and aromas obtainable in roast and ground coffee blends come from high grown coffees, it is desirable to include high percentages of high grown coffees in roast and ground coffee blends. HOwever, high grown coffees, as one might expect, are the most expensive of the three classes of coffees; and moreover, high grown flavor not complemented by other flavors is not desirable.

In regard to the blends of coffees presently sold in the market, it should be remembered that each of the roast and ground coffee products presently sold are characterized as being ground particles prepared from roasted whole coffee beans. These particles are substantially intact in cellular structure and are not compressed to provide substantial cellular disruption.

As used herein, the term "roast and ground coffee" refers to a coffee product comprising conventionally prepared roast and ground coffee particles often characterized herein as noncompressed coffee particles. It does not include flaked roast and ground coffee particles which are hereinafter referred to as "flaked coffee"; the term "roast and ground" encompasses both undecaffeinated and decaffeinated versions, unless otherwise stated.

While the presently marketed roast and ground coffee products do enjoy a substantial part of the coffee market, they have several disadvantages. One of the primary disadvantages is that conventional roast and ground coffee products have poor extractability. That is, during preparation of cups of roast and ground coffee beverage, it has been shown that only about 20 percent of the solid material contained in the roast and ground coffee is extracted during conventional percolation processes. The remaining portion of the coffee is discarded as grounds. The poor extractability either results in a weakened beverage or in excessive brewing time; in order to compensate for low extractability consumers usually increase the amount of coffee used to make a cup which increases expense to the consumer.

Flaked coffee is known in the art. McKinnis, U.S. Pat. No. 1,903,362, Rosenthal, U.S. Pat. No. 2,123,207, and Carter, U.S. Pat. No. 2,368,113, all disclose preparation of flaked coffee by roll milling roast and ground coffee. Of these three patents, the most relevant is McKinnis who discloses production of "very thin" and "substantially uniform thickness" coffee flakes by roll milling roast and ground coffee particles. However, in spite of the fact that the McKinnis patent has been in existence since Apr. 4, 1933, heretofore no one has produced a commercially successful flaked coffee product; moreover, at the present time not one known flaked coffee product is sold on the United States coffee market.

While each of the aboveH-cited patents discloses broadly the concept of flaking roast and ground coffee to increase extractability, none of the cited patents disclose flaking of roast and ground coffee as a means of regulating coffee flavor and aroma. Therefore, while increasing extractability is taught by these three prior art patents, the effect of flaking on coffee flavor and aroma is not taught by the prior art, and actually the prior art teaches away from this concept. The essence of applicant's invention lies in the discovery that flaking can be utilized as an effective process tool in regulating coffee flavor and aroma and in producing coffee products comprising as a major portion flaked intermediate and/or low grade coffees, and as a major portion high grade roast and ground coffee.

Applicant has surprisingly discovered that flaking of roast and ground coffee not only has an effect on the property of extractability but that it also can have a very definite effect on flavor and aroma. Even more surprisingly, applicant has discovered that the effect of flaking on flavor and aroma varies widely depending on the grade of coffee involved, and that flaking can be used selectively to advantageously regulate coffee flavor and aroma to produce an improved coffee product in accord with the objects of this invention. The invention resides in the selective utilization of this heretofore unknown aspect of flaking as an effective process tool to produce improved novel coffee products comprising unique mixtures of the different grades of coffees.

It is the object of this invention to regulate and control the flavor strength and aroma of coffee by providing a coffee product comprising as a major portion flaked coffee particles, said flakes being of low and/or intermediate quality, and as a minor portion roast and ground coffee particles, said roast and ground coffee comprising high grade coffees.

additional object of this invention is to provide roast and ground coffee flakes having unique physical characteristics suitable for a commercially attractive coffee product.

An additional object of this invention is to provide a process of making a coffee product comprising as a major portion flaked roast and ground coffee, said coffees being of intermediate and/or low grade coffees, and as a minor portion, roast and ground coffee particles, said particles being of high grade coffee varieties.

SUMMARY OF THE INVENTION

This invention relates to an improved roast coffee product characterized by enhanced extractability and a predominance of the delicate flavor and aroma characteristics of high quality coffee, aid product utilizing, in predominating proportions, flaked coffee of intermediate and/or low quality varieties.

Briefly and generally, the objects and advantages of the present invention are accomplished by compressing roast and ground coffee selected from a class consisting of the low and intermediate grade coffees into the form of flakes to diminish the undesirable flavor and aroma constituents and bring out the more desirable of such constituents naturally present in such coffees thereby enhancing their flavor and aroma properties from a consumer acceptance standpoint while simultaneously increasing their extractability, and thereafter admixing such coffee flakes with lesser amount of noncompressed roast and ground particles of the more expensive high grade coffees whose natural flavor and aroma properties are substantially unimpaired. Preferably, the resultant coffee product comprises from 70 percent to 90 percent by weight of a blend of low and intermediate quality coffee flakes. MOre preferably, the low and intermediate quality coffee flakes comprise 75 percent to 85 percent by weight of the coffee product, and the weight ratio of low to intermediate quality flakes if from 1.1:1 to 3.1.

DETAILED DESCRIPTION OF THE INVENTION

The essence of this invention lies in the discovery that flaking of roast and ground coffee particles can be used as an effective tool to modify flavor and aroma characteristics of various grades of coffees. As previously explained, this is indeed surprising in view of the prior arts teachings that flaking of coffee has no effect whatsoever on flavor and aroma.

As used herein, "natural flavor and aroma" refers to the flavor ans aroma of conventional roast and ground coffee; the phrase "flavor and aroma" per se refers to the flavor and aroma result achieved by compressing roast and ground coffee into flakes.

The effect of flaking of roast and ground coffee particles varies with the grade of roast and ground coffee particles to be flaked. For example, flaking of low grade coffees increases the strength of coffee beverages produced therefrom and also enhances the flavor and aroma of the low grade coffees by expelling natural volatile flavor constituents producing the bitter, rubbery-tasting notes which characterize there coffees. Conversely, when high grade coffees are flaked, while there is an increase in beverage strength, there is a decrease in favorable natural flavor and aroma qualities, When intermediate grade quality coffees are flaked, there is a slight decrease in aroma, an increase in strength and surprisingly, an increase in those natural flavors which are regarded as typically characteristic of intermediate grade coffees. The effect of flaking on each of these coffees will now be discussed in detail.

First in regard to low grade coffees, flaking of low grade coffees increases the strength of the resulting coffee beverage and enhances the flavor and aroma of a resulting coffee beverage.

Generally speaking, low quality coffees such as Robustas, produce brews with strong distinctive natural flavor characteristics often noted as bitter and possessing varying degrees of a rubbery flavor note, which are not considered desirable in large quantities in United States coffee products. HOwever, it has been surprisingly discovered that producing flaked low quality coffees enhances the flavor and aroma of the low quality coffee coupled with an increase in strength. In other words, the natural bitterness and rubber note usually characteristic of low quality coffees becomes much less dominant when the low quality coffee is a flaked low quality coffee.

This phenomenon i.e., increase in strength coupled with an enhancement in flavor and aroma, is unique to low quality coffees such as Robustas, low grade naturals such as Haiti XXX, Peru natural, current Salvadors, low grade Brazils, and low grade unwashed Arabicas such as Ugandas, Indonesians, Ivory Coast, Dominican Republics Ecuador Resacas and Guatemalan TEM's.

Turning now to intermediate grade quality coffees, when intermediate quality coffees are flaked, the resulting flaked coffee is characterized by an increase in strength, a slight loss of natural aroma, and an increase in those natural flavors which are regarded as typically characteristic of intermediate grade coffees. In other words, flaked intermediate grade coffee exhibits an increase in extractability, a slight decrease in natural aroma, and surprisingly, an increase in the typical, i.e. natural, flavor characteristics usually associated with the specific coffee involved. For example when intermediate grade Brazil coffees are flaked, there is an increase in extractability, a slight loss of natural Brazil aroma, and surprisingly, an increase in the typical flavor of Brazilian. coffees. This phenomenon i.e., increase in extractability, slight loss of aroma, and increase in characteristic and/or natural flavor, is unique to flaked intermediate grade coffees. Suitable intermediate grade coffees for flaking are Brazilian coffees such as Santos and Paranas, African naturals, and Brazil free from strong Rioy flavors such as good quality Sul de Minas.

Turning now to the effect of flaking on high grade coffees, when high grade coffees are flaked the resulting coffee is increased in strength, i.e., extractability, and there is a substantial decrease in both natural flavor and aroma. For example, when high grade Arabicas such as Colombians are flaked, there is an decrease in natural flavor and aroma of the resulting flaked high grade Colombian, coupled with an increase in strength. Because of the loss of typical, i.e. natural, high grade flavor and aroma when flaking high grade coffees, there is little motivation to produce a flaked coffee product comprising 100 percent coffee flakes wherein the flakes are high grade coffee flakes. This is so because the primary motivation in including high grade coffees in a coffee product is to improve flavor and aroma. Examples of typical high quality coffees are "milds" often referred to as high grade Arabicas, and include, among others, Colombians, Mexicans, and other washed milds, such as strictly hard bean Costa Ricans, Kenyas A and B's, and strictly hard bean Guatemalans.

It has been surprisingly discovered that, utilizing the above-described effects of flaking on coffee flavor and aroma, an improved roast coffee product can be prepared. The improved roast coffee product of this invention is superior to products comprising all roast and ground coffee particles in that it has increased extractability, greater flavor strength, and an aroma equal to that of conventional roast and ground coffee products. The improved roast coffee product of the invention is superior to a 100 percent flaked coffee product in that it has a superior flavor and aroma.

In its broadest aspect, the improved roast coffee product of this invention comprises as a major portion low and/or intermediate quality coffee flakes and as a minor portion high grade coffee ground.

It is preferred that the major portion of the improved coffee product of this invention, i.e., the flake portion, be comprised or a blend of low quality and intermediate quality coffee flakes. However, if desired, all low quality coffee flakes or all intermediate quality coffee flakes can be utilized. Of course, because flaking affects the flavor and aroma of low quality coffees and intermediate quality coffees in a different manner, utilization of all one grade to the exclusion of the other will provide a product of differing flavor and aroma. In the preferred embodiment of utilizing a blend of low and intermediate quality flakes, it is preferred that the weight ration of low to intermediate quality flakes be within the range of from 0.1:1 to 3:1, and most preferably within the range of 0.5:1 to 2:1. Preferably the low grade and intermediate grade coffees are blended and then flaked simultaneously; however, they can also be flaked individually and subsequently blended.

Suitable high grade coffees for the roast and ground coffee minor portion of the improved roast coffee product of this invention, and suitable low and intermediate quality coffees for the major flake portion of the improved roast coffee product of this invention have been previously set forth in this specification.

In a most preferred aspect of this invention, the improved roast coffee product comprises a mixture of flaked roast and ground coffee with roast and ground coffee particles wherein the roast and ground coffee particles comprise from 10 percent to 30 percent by weight of said product, said roast and ground coffee particles being of high grade variety and said flaked roast and ground coffee being of low and/or intermediate quality coffees.

The principal advantages of producing a product comprising as a major portion thereof flaked roast and ground coffee are three-fold.

First, as just explained, the modification in flavor strength and aroma capable of being achieved by utilization of flaked coffee allows greater control over ultimate product flavor and aroma as will as blend variation in producing the product.

The second principal advantage of a product comprising as a major portion thereof, flaked roast and ground coffee, is that the product provides a brew of increased strength. As mentioned previously, flaked roast and ground coffee provides increased extractability and therefore increases brew strength; consequently the improved roast coffee product of this invention because a major portion of said product is flaked roast and ground coffee, provides a product of substantially increased beverage strength.

Third, disruption of the cellular structure of coffee during milling to compress into flakes, as later explained in detail, provides an easy means of escape for gases contained in coffee cells. Degassing is highly advantageous in that in subsequent packaging compensation for slow gas evolution need not be made. For instance, many roast and ground coffees presently sold on the market are vacuum packed in strong metal containers. Vacuum packing is employed as a means of providing a reduction in the internal container pressure, the buildup of which is caused by gases evolving from coffee cells. Thus, slow gas evolution from coffee cells necessitates the employment of an expensive vacuum packing procedure. It also necessitates the utilization of strong metal containers. The strong metal containers are employed to prevent internal pressure from bulging the container. Providing a substantially degassed flaked roast and ground coffee product avoids the necessity of utilizing a vacuum packing procedure and of utilizing expensive strong metal container. The improved roast coffee product disclosed herein can be packed in foil fiber containers or in thinner and less expensive metal containers and need not be vacuum packed.

The principal disadvantage of flaked roast and ground coffee per se, with the exception of flaked low quality coffees, is the lack of desirable aroma and volatile constituents. Providing a product with pleasing aroma and flavor-laden volatile constituents is essential if high consumer acceptance is to be obtained.

Admixing roast and ground coffee particles with flaked roast and ground coffee within the most preferred range of from 10 percent of 30 percent by weight of roast and ground coffee particles overcomes the disadvantage of flaked roast and ground coffee and yet retains the principal advantages of flaked roast and ground coffee.

As mentioned previously, it is preferred that the mixture of flaked roast and ground coffee and roast and ground coffee particles consist of from 10 percent to 30 percent by weight of roast and ground coffee particles. If less than 10 percent by weight of roast and ground coffee particles is utilized the product does not have a significant increase in aroma quality. On the other hand, if amounts of roast and ground coffee particles substantially in excess of 30 percent by weight are utilized the advantages of utilizing flakes of roast and ground coffee in the mixture are substantially decreased, i.e., the substantial increase in brew strength coupled with flavor changes does not occur to a significantly noticeable degree. To obtain the advantages of flaked roast and ground coffee and yet maintain a product of high aroma and flavor, especially good results are achieved when the roast and ground coffee particles comprise from 15 percent to 25 percent by weight of the mixture.

Of course, as explained with respect to the broader description of this invention, as long as the flaked coffee is a major portion (i.e., greater than 50 percent and the roast and ground coffee a minor portion (i.e. less than 50 percent an improved roast coffee product is still produced. Thus, the above narrower weight percentages are given with reference to highly preferred embodiments.

In regard to the particle size of the roast and ground coffee employed in the flaking process, it is preferred that the coffee be regular, drip, or fine grind as these terms are used in a traditional sense. The standards of these grinds as suggested in the 1948 simplified Practice Recommendation by the U.S. Department of Commerce (see Coffee Brewing Workshop Manual, page 33, published by the Coffee Brewing Center of the Pan American Coffee Bureau) are as follows: "Regular grind," 33 percent is retained on a 14 mesh Tyler standard sieve, 55 percent is retained on a 28 mesh Tyler standard sieve and 12 percent passes through a 28 mesh Tyler standard sieve; "drip grind" 7 percent is retained on a 14 mesh Tyler standard sieve, 73 percent on a 28 mesh Tyler standard sieve and 27 percent passes through a 28 mesh Tyler standard sieve; and "fine grind," 100 percent passes through a percent being retained on a 28 mesh Tyler standard sieve. and 30 percent passing through a 28 mesh Tyler standard sieve. Of the above mentioned grind sizes, the most preferred is regular grind.

In making the flaked roast and ground coffee to be utilized in this invention, it is preferred that grind sizes finer than fine grind not be employed. For example, when Espresso grind is utilized a high incidence of fine coffee particles is found to exist after the roll milling operation which is utilized in producing flaked coffee; this high incidence of fine coffee particles has the disadvantage of producing unsightly coffee dust which is often associated with high percentages of fines. However, a certain small percentage of fines present in the improved roast coffee product of this invention has been found to be desirable. MOre specifically, in providing a consumer acceptable product it is preferred that the improved roast coffee product, i.e., the flakes and grounds mixture, have suitable particle dimension such that from 3 to 10 percent of said product will pass through a 40 mesh U.S. Standard screen and not more than 35 percent will remain on a a 12 mesh U.S. Standard screen. It has been found that if less than 3 percent of the improved roast coffee product passes through a 40 mesh screen, the liquid flow through a percolator basket containing said product becomes to rapid and insufficient contact time of the extraction liquid and the flaked coffee portion of the coffee product will result in a weakening of the brew strength. On the other hand, if more than 10 percent of the improved coffee product passes through a 40 mesh screen the high incidence of very fine particles tends to produce a consumer-undesirable "float brew" and also increases the amount of pot sediment. A float brew refers to a condition in a percolator basket wherein the basket holes become plugged. This causes a buildup of liquid in the basket and floating of coffee particles to the top of the basket. The result is a weak brew due to under extraction. Additionally, it has been found that if more than 35 percent of the improved roast coffee product is of particle dimensions such that it remains on a 12 mesh U.S. Standard screen, consumer preference for the product is substantially decreased.

As previously mentioned, a preferred embodiment of this invention provides a flavor-enhanced product of high consumer preference. This preferred embodiment comprises producing flaked coffee from a blend of low and intermediate quality coffees and admixing therewith, within the prescribed ranges, roast and ground coffee particles produced from high quality coffees.

In this preferred embodiment, the flakes of roast and ground coffee are prepared from coffee beans such s those listed above under the intermediate and low quality categories.

The coffees to be utilized in forming the roast and ground coffee particles are those listed above under high quality coffee beans and can be generically described as "milds." It is within the scope of this invention that various blends of high quality coffees such as a blend of Mexicans and Columbians, for example, can be employed in producing high quality roast and ground coffee particles.

The principal advantage of producing the improved roast coffee product of this invention from low and intermediate quality coffee beans in regard to the roast and ground flakes and high quality coffee beans in regard to the roast and ground coffee particles is that a substantial flavor and aroma enhancement is noted. While not wishing to be bound by a theory it is believed that the explanation of this phenomena is as follows: The roll milling process, hereinafter explained, utilized to produce flaked roast and ground coffee disrupts the cellular structure of the coffee particles and allows for easy exiting of gases contained within the coffee cells. While this is advantageous in that a degassed coffee product is produced, some of the escaping constituents, such as delicate aroma and volatile constituents, are desirable. Thus, flaking especially of high quality coffees, may involve a loss a prime quality coffee flavor notes. On the other hand, flaking of roast and ground coffee particles greatly increases the surface area of the particles and consequently when brewed, flakes produce a strong flavored coffee with excellent body. In regard to roast and ground coffee particles produced from high-quality coffee beans, those ground particles are flavor laden with delicate, natural, prime aroma and flavor constituents. Thus, any admixture of these two components produces a substantially degassed product which has a strong body flavor and which is additionally characterized by having delicate prime flavor and aroma characteristics present even though a substantial portion of the coffee in the novel product has been flaked.

In forming flakes of roast and ground coffee particles to be utilized in the coffee product, the roast and ground coffee is subjected to a mechanical compressing pressure by passing roast and ground coffee through two parallel smooth or highly polished rolls so that the coffee particles passing between the rolls are crushed and flattened such that the coffee cellular structure is disrupted and the resulting appearance is that of a flake. Smooth of highly polished rolls are desirable because these rolls are easy to clean. Other rolls can be used if the desired flaking of roast and ground coffee particles can be obtained. The flakes are formed in integral units, are moderately firm and can be easily handled. If desired, the flaked roast and ground coffee can also be passed through a series of roll mills but in the preferred embodiment for forming flaked roast and ground coffee to be utilized in the product of this invention passage of the roast and ground coffee particles through two parallel rolls is used.

The flaking operation results in the roast and ground coffee particles being crushed and dropped from the rolls in the form of flakes. The roll milling can be accomplished in any of the well-known and commercially available roll mills such as those sold under the trademarks of Lehmann, Thropp, Farrell and Lahoff.

The process of mixing flaked roast and ground coffee and roast and ground coffee particles within the prescribed ranges to form the improved roast coffee product of this invention is not critical. Any suitable method of admixing which does not involve shear mixing can be employed. Shear mixing is unsuitable because shear mixes cold work the flakes of roast and ground coffee causing them to break up and form fines and unsightly coffee dust. Especially desirable and suitable mixing devices are revolving "horizontal plane baffle" mixers such as a common cement mixer; however, the most preferred blenders are falling chute riffle blenders.

A falling chute riffle blender is comprised of a large cylindrical tubelike vessel with downwardly 35 baffles mounted on the inside walls thereof. To promote gentle tumbling and intermixing the roast and ground coffee particles and flaked roast and ground coffee to be admixed are gravity fed through the baffled vessel. As the flakes and grounds tumble down they hit each baffle and, because the baffles are mounted in a downward angle, slide off and fall down onto baffles mounted in lower positions. By the time the flakes and grounds reach the bottom they have become (more or less) uniformly admixed. At the bottom of the vessel the mixture can be drawn off into a vessel or can be carried away on a conveyor belt for easy packaging.

To insure uniform intermixing within the preferred range of from 10 percent to 30 percent by weight of roast and ground coffee particles, the roast and ground coffee particles and the flaked roast and ground coffee are gravity fed into the top of the falling chute riffle blender at flow rates calculated to give mixtures within the prescribed range. For instance, if a mixture comprising 20 percent roast and ground coffee particles is desired, roast and ground coffee particles can be fed into the falling chute riffle blender at a rate of 900 lbs./hr. and flaked roast and ground coffee particles can be fed into the blender at a rate of 36000 lbs./hr.

While flaking of roast and ground coffee offers several advantages, all enumerated above, flaking of roast and ground coffee also produces one disadvantage in regard to packaging of the product. This disadvantage is the tendency of flaked roast and ground coffee to vary in bulk density from the bulk density and/or "tamped bulk density," the two being used interchangeably, of roast and ground coffee. As used these terms herein refer to the overall density of a plurality of particles measured after vibratory settlement in a manner such as that described on pages 130 and 131 of Sivetz, "Coffee Processing Technology," Avi Publishing Company, Westport, Conn., 1963, Volume II. It has been surprisingly discovered that flaked roast and ground coffee having a certain range of thicknesses, elaborated in detail below, will not change their bulk density after packaging and handling.

More specifically, providing roast and ground coffee flakes having a bulk density of from 0.38 g./cc. to 0.5 g./cc. is essential if consumer acceptance is desired. This is so because bulk densities within this range are generally the bulk densities of conventionally prepared roast and ground coffees of "regular," "drip" and "fine" grind. If the bulk density varies from this range and is for example higher, the consumer would need to use a substantially lesser than usual quantity of coffee to produce a brew of given strength; this required adjustment in consumer habits might be made with some difficulty.

A preferred roast and ground coffee flakes bulk density is from 0.42 g./cc. to 0.48 g./cc. However, providing roast and ground coffee flakes having a bulk density within the previously referred to broader range or the preferred narrower range of from 0.42 g./cc. to 0.48 g./cc. is not an easy accomplishment because the physical characteristics of thin flaked coffee are such that a propensity for variegated product bulk density exists. This so because upon packing in a container flaked coffee has a tendency for the flakes to align themselves in parallel planes producing a very compact product with a bulk density substantially higher than that of roast and ground coffees presently marketed. MOreover, the parallel plane alignment which takes place primarily after packing, increases the container outage. In other words, the space between the upper surface of the product and the upper surface of the container is increased due to settling of the flaked product. Large container outages are frowned upon by the consumer. Additionally, the higher tamped bulk density would necessitate an adjustment in consumer habits of volumetric measurement.

Flaked coffee generally has a flake thickness of from 0.001 inches to 0.030 inches. Thin flakes (i.e. 0.001 inches to 0.007 inches) are undesirable because of their cellophanelike appearance and fragile nature; on the other hand, very thick flakes (i.e. 0.026 inches to 0.030 inches) are undesirable because of their high flake density. Flakes of intermediate thickness, (i.e. from 0.008 inch to 0.025 inch) have been found especially desirable for a number of reasons, enumerated below.

To produce roast and ground coffee flakes having the requisite bulk density as previously discussed, and which do not have a propensity towards changing bulk density after packing, it is essential that the flaked coffee have a flake thickness of from 0.008 inch to 0.025 inch and preferably from 0.010 inch to 0.016 inch. Flaked coffee having a flake thickness within the above referred to broader range and especially within the preferred narrower range, has been found to be more stable with respect to product bulk density. This is to say, flaked coffee of intermediate thickness ranges is much less susceptible to variable bulk density.

Flaked coffee having a thickness within the prescribed range has an additional physical characteristic in that at least from 70 to 85 percent of the coffee cells are disrupted, as revealed by microscopic examination. This large amount of cellular disruption is advantageous in that 33 percent more cups of coffee of uniform beverage strength can be prepared from a given weight of flaked coffee having a flake thickness of from 0.008 inch to 0.025 inch than from the same weight of roast and ground noncompressed, i.e. nonflaked, coffee. While not wishing to be bound by any theory, it is believed this is so primarily because flaked coffee within the previously specified thickness range lacks a visible cell structure, i.e. is amorphous in structure which in turn allows for easy releasing of coffee components in extraction. This is contrary to roast and ground coffee wherein the coffee particles are cube-shaped shaped and cellular disruption occurs only along the sides of the cubes.

In providing an acceptable flaked coffee product it is also essential that the flake moisture level be from 2.5 to 7.0 percent by weight. It is preferred that the moisture level be from 3.0 to 6.0 percent. Lower moisture contents than 2.5 percent are to be avoided because the resulting flake is very fragile and often breaks during process handling and packing. Too large a percentage of broken flakes in turn changes the product bulk density which if it falls without the range of from 0.38 g./cc. to 0.50 g./cc. will produce a consumer unacceptable product. On the other hand moisture contents above 7.0 percent are to be avoided because the flakes become tacky and oily in appearance. Moreover, if the coffee moisture content is higher than 7.0 percent prior to roll milling to produce flakes, water extrusion during milling occurs and the staling propensity of the resultant flakes is substantially increased.

In providing a consumer acceptable flaked coffee product it is preferred that the flaked coffee have a color which is defined by a Hunter Color "L" scale value ranging from 18 to 23, with from 19 to 21 being most preferred. Flaked coffee Hunter Colors within these ranges have been found to be desirable because within these ranges the flaked product has a color impression substantially equal to that of roast and ground coffee, which the consumer regards as highly desirable.

The Hunter Color scale values, utilized herein to define a preferred color of a flaked coffee product, are units of color measurement in the Hunter Color system. That system is a well-known means of defining the color of a given material. A complete technical description of the system can be found in an article by R. S. Hunter, "Photoelectric Color Difference Meter," Journal of the Optical Society of America, Vol. 48, pp 985–95, 1958. Devices specifically designed for the measurement of color on the Hunter scales are described in U.S. Pat. No. 3,003,388 to Hunter et al., issued Oct. 10, 1961. In general, Hunter Color "L" scale values are units of light reflectance measurement, and the higher the value is, the lighter the color is since a lighter colored material reflects more light. In particular in the Hunter Color system the "L" scale contains 100 equal units of division; absolute black is at the bottom of the scale ($L=0$) and absolute white is at the top of the scale ($L=100$). Thus in measuring Hunter Color values of the flaked coffee of this invention, the lower the "L" scale value the darker the flakes. The "L" scale values described herein are also accurate means of defining the degree of roast necessary to produce a coffee which when flaked gives a product within the "L" scale values herein described. Determination of optimum roasting conditions varies with the coffee employed but is within the skill of one knowledgeable in the field and can be determined after a few Hunter Color measurements of degrees of roast and comparison of the roasted and ground color values with the roasted ground and flaked color values.

Certain roll milling processing conditions have been found especially desireable in producing flakes having the desired physical characteristics such that the tendency for variation in bulk density is eliminated. Generally speaking, these conditions are roll temperature, roll pressure, and roll diameters.

The temperature of operation of the roll mill in forming flaked roast and ground coffee is normally from 32° to 300° F. However, for utilization in preparing the flaked coffee used in this invention, the temperature of the roll mill during flaking is not critical. Extremely high temperatures should be avoided because degradation of flavor and aroma constituents of the roast and ground coffee particles can result and extremely low temperatures are not practical in that the use of refrigeration equipment is necessitated. In the usual method of operation the coffee particles immediately after being ground are passed through a roll mill to obtain flaked roast and ground coffee. The ground coffee can, if desired, be allowed to cool to room temperature and subsequently passed through the roll mill to form flakes of roast and ground coffee.

The pressure exerted on the ground coffee by the rollers in the roll mill ranges from 100 lbs./linear inch of nip to 10,000 lbs./linear inch of nip and preferably from 600 lbs./linear inch of nip to 6000 lbs./linear inch of nip. Extremely high pressures, i.e., above 10,000 lbs./linear inch of nip are to be avoided because with high pressures too much coffee oil is expelled coating the surface of the roll. The oil on the rolls acts as a lubricant making the flaking operation difficult. Additionally, extremely high pressures make very thin, weak flakes. Very low pressures are to be avoided because of the insufficient cellular disruption which is necessary to obtain proper extraction.

Flakes can be made with one pass through a two roll mill having roll diameters within a wide range, for example, as small as 4 inches and as large as 80 inches or even larger, but preferably from 6 inches to 30 inches and operating at peripheral speeds of from 1 ft./min. up to 1500 ft./min., but preferably from 10 ft./min. to 900 ft./min. The optimum yield of desirable flakes is generally obtained when the rolls operate at approximately the same speeds. Differential roll speeds, however, can be utilized. Roll speed ratios in excess of 1.5:1 are not desirable. Preferably when differential roll speeds are employed the roll speed ratio is within the range of from 1:1 to 1.4:1.

The feed rate of the roast and ground coffee to be flaked, into the roll mill is not critical; either choke feeding or starve feeding can be employed. Choke feeding is defined as having excess amounts of coffee settling on the roll mills waiting to pass through the nip. It is the opposite of strave feeding.

The following examples are offered to further illustrate but not limit the invention disclosed herein. Unless otherwise stated, the coffee employed was not decaffeinated.

EXAMPLE I

A blend of low quality Arabicas, Robustas, and intermediate quality Brazils and African Naturals, each on a 25 percent weight basis, is prepared. The weight ratio of low quality coffees to intermediate quality coffees is 1:1. Five hundred pounds of this blend is roasted in a Jubilee roaster at air temperatures maintained within the range of 400°–440° F. The end roast temperature is 440° F. The total time is 16 minutes and 31 seconds. Thereafter the roasted beans are quenched with 10 gallons of water.

A 500 pound blend of high grade Arabicas comprised of Colombians and Kenyas is also prepared and roasted as described above.

Portions of the above blended roast coffee beans are ground, as needed, to regular grind size in a Gump pilot grinder. Twenty pounds of the above blended low and intermediate quality roast coffee beans is ground to regular grind size. Five pounds of high quality blend is ground to regular grind size, and is set aside. The low and intermediate quality 20 pound blend is used to prepare flaked roast and ground coffee in the following manner. The coffee is choke fed into a Farrell two-roll mill at a roll pressure of 3000 lbs./in. of nip. The roll surface temperature is 100° F., the roll peripheral speed is 35 ft./min.; and the coffee moisture level is about 5.4 percent. The thickness of the compressed coffee flakes produced is 0.11 inches and the flake bulk density is 0.45 g./cc. The 20 pound blend of low and intermediate quality flaked roast and ground coffee is admixed with 5 pounds of high quality roast and ground coffee in revolving horizontal plane baffle mixer. A uniform admixture is achieved after 15 seconds. The admixture is screened so that 3 percent of said product will pass through a 40 mesh U.S. Standard screen and 10 percent of said product remains on a 12 mesh U.S. Standard screen. The percent of ground coffee in the mixture was 20 percent.

A panel of four expert tasters prepared cups of coffee from the improved roast coffee product in the following manner: The amount of improved roast coffee product prepared as described above was 7.2 g./cup; the amount of water used per cup was 178 milliliters; the coffee was placed in a conventional percolator and allowed to perk until the temperature reached 180° F. at which time the coffee beverage was poured into cups to be tasted by the expert panel. The panel compared the taste of coffee brewed from the coffee product of this invention with conventionally prepared coffee beverage prepared from regular grind Folger roast and ground coffee. The experts noted that the coffee product of this invention was about 15 percent stronger in flavor strength than coffee brewed from standard roast and ground coffee, regular grind size; additionally it was flavor laden with aromatic notes and had good aroma.

Utilizing the blended and roasted ground coffees prepared in this example, the following tests are conducted:
1. A portion of the blended low and intermediate quality flaked roast and ground coffee is used to prepare a product comprising 100 percent flaked roast and ground coffee, hereinafter product (1).
2. Flaked roast and ground coffee and roast and ground coffee particles are utilized to make a product comprising 70 percent by weight of flaked low and intermediate grade roast and ground coffee and 30 percent by weight of high grade roast and ground coffee particles, hereinafter product (2).

A panel of four expert tasters prepared cups of coffee from products (1) and (2) in the manner previously set forth in this example. The panel compared the taste of coffee brewed from products (1) and (2). In comparing product (1) beverage with beverage produced from the improved roast coffee product of this invention (product 2), the panel noted that product (1) was lacking in flavor-laden aromatic and volatile constituent flavor and aroma notes and characterized the coffee as somewhat flatter in taste than the coffee product of this invention.

EXAMPLE II

Five hundred pounds of a blend of low quality Robustas, intermediate quality Brazils, and low quality Arabicas each on a 33-⅓ percent weight basis are roasted in a Jubilee roaster at air temperatures maintained within the range of 400°–435° F. The weight ratio of low quality to intermediate quality coffees is 2:1. The end roast temperature is 435° F. The total roast time is X 15 minutes; and the roast is quenched with 9 gallons of water.

One hundred pounds of the above referred to blended and roasted coffee beans are ground to regular grind size in a Gump pilot grinder and used to prepare flaked roast and ground coffee in the following manner. The coffee is choke fed into a Farrell two-roll mill; the roll pressure is 6000 lbs./inch of nip; the roll surface temperature is 100° F., the roll peripheral surface speed is 35 ft./min. and the coffee moisture level 3.2 percent. The thickness of the coffee flakes produced is 0.145 inch. The flake bulk density is 0.47 g./cc.

Five hundred pounds of high quality prime Arabica roast and ground coffee, known as Colombians is roasted and ground as described earlier in example I. A 25 pound portion of the high quality prime roast and ground coffee, regular grind size, is placed in a loading hopper mounted above a falling chute riffle blender; and likewise the 100 pounds of flaked roast and ground coffee is placed in a second loading hopper mounted above the blender. The high grade prime roast and ground coffee particles are gravity fed into the blender at a rate of 10 lbs./min. and the flaked roast and ground coffee is gravity fed into the blender at a rate of 40 lbs./min. The admixed product is collected at the bottom of the blender.

The percent of ground coffee in the mixture was 20 percent.

A panel of four expert tasters prepared cups of coffee from the admixed product in the manner previously described in example I. The experts noted about a 25 percent increase in strength in comparing the improved roast coffee product beverage with conventional roast and ground coffee beverage. Besides the strength increase the panel also noted that the coffee product of this invention was flavor laden with aromatic and volatile constituent flavor notes.

While in examples I and II the method of preparing brewed cups of coffee from the coffee product of this invention was percolation, other equally suitable brewing methods can also be employed such as the drip method or the vacuum pot method.

For d detailed description of a preferred method of making roast and ground coffee flakes useful in the practice of my invention see copending, commonly assigned, application Ser. No. 823,942, filed May 12, 1969, of McSwiggin et al., entitled "A Method of Making Flaked Roast and Ground Coffee." Another copending, commonly assigned application, Ser. No. 823,900, filed May 12, 1969, of Menzies at al., entitled "A Method of Starve Feeding Coffee Particles," shows a further process improvement in the process of roll milling coffee particles to produce coffee flakes.

EXAMPLE III X

A blend of commercially sold roast and ground intermediate quality coffees, regular grind size comprising 25 percent African Naturals and 75 percent Brazils, was obtained. Five hundred pounds of this blend was used to prepare flaked coffee in the following manner. The coffee was choke fed into a Farrel two-roll mill at a roll pressure of 4000 lbs./inch of nip. The roll surface temperature was 100° F; the roll peripheral speed was 4 ft./minute; and the coffee moisture level was 4.5 percent. The thickness of the flake produced was 0.016 inches and the flake bulk density was 0.45 g./cc. The flake moisture content was 4.5 percent and the flake Hunter Color "L" scale value was 21. The flakes were of a proper size dimension such that 3.0 percent of the pass through a 40 mesh U.S. Standard Screen and not more than 35 percent remains on a 12 mesh U.S. Standard Screen.

Photomicrographs of the above described roast and ground coffee flakes showed substantially complete (nearly 100 percent) cellular disruption.

A panel of four expert tasters prepared cups of coffee from the flaked coffee product in the manner previously described in example I. The panel compared the taste and aroma of coffee brewed from the flaked intermediate quality coffee product with conventionally prepared coffee beverage prepared from regular grind Folger roast and ground coffee. The experts noted that the flaked coffee product was about 33 percent stronger in taste than coffee brewed from standard roast and ground coffee, regular grind size. In further comparing the flaked product with a roast and ground coffee product prepared from the same intermediate quality coffee blend, the panel noted the strength increase was coupled with a slight loss of natural aroma and a noticeable increase in the characteristic flavor of intermediate grade Brazils and African Naturals.

When the flaked intermediate grade coffee of this example is admixed with high grade coffee ground (85 percent flakes and 15 percent grounds) and cups of beverage prepared therefrom the panel rates the product as of good aroma and flavor.

EXAMPLE IV

Three hundred and one pounds of low grade Robustas were roasted in a Jubilee roaster at air temperatures maintained within the range of 400°–550° F. The end roast temperature was 450° F. The total roast time was 19 minutes, and the roast was quenched with 6 gallons of water.

Fifty pounds of the above referred to roasted Robusta coffee beans are ground to regular grind size in a Gump pilot grinder and used to prepare flaked roast and ground coffee in the following manner. The coffee was choke fed into a Farrel two-roll mill; the roll pressure was 4000 lbs./inch of nip; the roll surface temperature was 100° F.; the roll peripheral surface speed was 6 ft./minute and the coffee moisture level, 4.5 percent. The thickness of the Robusta flake produced was 0.015 inches and the flake bulk density was 0.45 grams./cc. The flake moisture content was 4.0 percent by weight and the flake Hunter Color "L" scale value was 23.

A panel of four expert tasters prepared cups of coffee from the flaked Robusta product in the manner previously described in the above examples. The experts noted that there was a substantial decrease of natural Robusta flavor in the coffee beverage produced from the flaked Robustas. Additionally, the panel noted a flavor and aroma enhancement in the flaked Robusta over unflaked Robusta in that the bitterness and rubbery note usually characteristic of Robusta was much less dominant.

When the flaked low grade coffee of this Example is admixed with high grade coffee grounds (70 percent flakes and 30 percent grounds), and cups of beverage prepared therefrom, the panel rates the product as a good aroma and acceptable flavor.

EXAMPLE V

Four hundred pounds of a blend comprising high quality Arabicas is roasted in a Thermalo roaster at air temperatures maintained within the range of 400°–550° F. The end roast temperature is 430° F. The total roast time is 16 minutes and the roast is quenched with 7 gallons of water.

The above referred to high quality roasted blend is ground to regular grind sizes in a Gump pilot grinder and used to prepare flaked roast and ground coffee in the following manner. The coffee is starve fed into a Lenhman two-roll mill; the roll pressure is 3000 pounds/inch of nip; the roll surface temperature is 100° F.; the roll peripheral speed is 184 ft./minute and the coffee moisture level 4.5 percent. The thickness of the flakes produced is 0.0135 inches and the flake bulk density is 0.425 g./cc. The flake moisture content is 4.0 percent by weight and the flake Hunter Color "L" scale value is 20.

A panel of four expert tasters prepared cups of coffee from the roast and ground high quality compressed coffee flakes in the manner previously described in example I. In comparing the flaked coffee of this example with regular grind Folger roast and ground coffee and roast and ground high quality coffee particles, the panel notes the flaked coffee is about 33 percent stronger in taste than the regular grind Folger, and lacking in characteristic prime quality flavor and aroma notes. In comparison with the high quality ground but not flaked product, the same distinctions are noted except the lack of prime flavor and aroma is even more noticeable.

When each of the above examples are repeated using the same blends of coffees except that the blends are decaffeinated, substantially similar results are obtained in that the same extractability, and flavor and aroma changes are noted.

What is claimed is:

1. An improved roast coffee product of enhanced extractability, flavor and aroma characterized by predominance of the delicate flavor and aroma notes naturally characteristic solely of high grade coffees comprising:
   a. as a minor portion thereof, noncompressed, high grade roast and ground coffee particles of unimpaired natural flavor and aroma; and
   b. as a major portion thereof, roast and ground coffee selected from a class of coffee consisting of the low and intermediate grade coffees, said low and intermediate grade coffees being in the form of compressed flakes wherein the undesirable natural flavor and aroma constituents thereof have been diminished and the extractability thereof enhanced.

2. The improved roast coffee product of claim 1 wherein the major portion comprises low quality coffees.

3. The improved roast coffee product of claim 1 wherein the major portion thereof comprises intermediate quality coffees.

4. The improved roast coffee product of claim 1 wherein the major portion comprises a blend of low and intermediate quality coffees.

5. The coffee product of claim 4 wherein said flaked roast and ground coffee has a flake bulk density of from 0.38 g./cc to 0.50 g./cc.

6. The improved roast coffee product of claim 4 wherein the weight ratio of low quality flakes to intermediate quality flakes is within the range of form 0.1 to 1 to 3 to 1.

7. The improved roast coffee product of claim 6 comprising flaked roast and ground coffee and roast and ground coffee particles wherein said roast and ground coffee particles comprise from 10 percent to 30 percent by weight of said product.

8. The coffee product of claim 7 wherein from 3 to 10 of said product will pass through a 40 mesh U.S. Standard screen and wherein not more than 35 percent of said product will remain on a 12 mesh U.S. Standard screen.

9. The coffee product of claim 7 wherein said roast and ground coffee particles comprise from 15 to 25 percent by weight of said product.

10. The coffee product of claim 9 wherein said flaked roast and ground coffee has a flake thickness of from 0.008 inch to 0.25 inch.

11. The coffee product of claim 10 wherein said flaked roast and ground coffee has a flake thickness of from 0.010 inch to 0.016 inch.

12. The improved roast coffee product of claim 1 comprising flaked roast and ground coffee and roast and ground coffee particles wherein said roast and ground coffee particles comprise from 10 to 30 percent by weight of said product.

13. The coffee product of claim 12 wherein from 3 to 10 percent of said product will pass through a 40 mesh U.S. Standard screen and wherein not more than 35 percent of said product will remain on a 12 mesh U.S. Standard screen.

14. The coffee product of claim 12 wherein said roast and ground coffee particles comprise from 15 to 25 percent by weight of said product.

15. The coffee product of claim 14 wherein said flaked roast and ground coffee has a flake thickness of from 0.010 inch to 0.016 inch.

16. The coffee produce of claim 1 wherein said flaked roast and ground coffee has a flake thickness of 0.008 inch to 0.25 inch.

17. The coffee product of claim 1 wherein said flaked roast and ground coffee has a flake bulk density of from 0.38 g./cc to 0.50 g./cc.

18. A coffee product in accordance with claim 1 in which said coffee flakes comprise low grade Robusta coffees and said noncompressed coffee particles comprise high grade Arabica coffees.

19. A coffee product in accordance with claim 1 in which said coffee flakes comprise intermediate grade Brazilian coffees and said noncompressed coffee particles comprise high grade Arabica coffees.

20. A coffee product in accordance with claim 1 in which said coffee flakes comprise low grade Robustas and intermediate grade Brazil coffees, and in which said noncompressed coffee particles comprise high grade Arabica coffees.

21. A coffee produce in accordance with claim 1 in which the flakes are made from coffee selected from the class consisting of Robustas, low grade Naturals, low grade Brazils, low grade unwashed Arabicas, intermediate Brazils, African Naturals, others free from strong Rioy flavors and combinations thereof; and in which the noncompressed high grade roast and ground coffee particles are made from coffees selected from the class consisting of high grade Arabicas and combinations thereof.

22. A coffee produce in accordance with claim 21 in which said low grade Naturals comprise Haiti XXX, Peru Naturals, and Current Salvadors, said low grade unwashed Arabicas comprise Ugandas, Indonesians, Ivory Coast, Dominican Republics, Ecuador Resacas, and Guatemalan Tem's, said intermediate grade Brazils comprise Santos and Paranas, and said other coffees free from strong Rioy flavors comprise good quality Sul de Minas; and in which said high grade Arabicas comprise Colombians, Mexicans, and other washed Milds such as strictly hard bean Guatemalans.

23. A coffee product in accordance with claim 1 in which said compressed coffee flakes have a substantial portion of their cells disrupted.

24. A coffee product in accordance with claim 23 in which said compressed coffee flakes have at least from about 70 to about 85 percent of their coffee cells disrupted.

25. A method for preparing an improved roast coffee product characterized by enhanced extractability and a predominance of the delicate flavor and aroma characteristics of high quality coffee utilizing in predominating proportions flaked roast and ground coffee of low and intermediate quality varieties, said process comprising:
   a. roasting and grinding into particles low quality coffees and thereafter substantially enhancing the extractability of said coffee particles while simultaneously substantially reducing their natural volatile flavor constituents by expelling a substantial portion of the natural flavor-producing constituents normally entrapped therein by compressing said coffee particles into flakes.;
   b. roasting and grinding into particles intermediate quality coffees and thereafter substantially enhancing the extractability of said coffee particles while simultaneously decreasing their aroma and increasing their natural flavor producing capacity by expelling a substantial portion of the natural gases normally entrapped therein by compressing said coffee particles into flakes;
   c. roasting and grinding coffee of the high quality variety to form non-compressed coffee particles of unimparied flavor and aroma; and
   d. admixing said low and intermediate quality coffee flakes in predominating proportions with said high quality coffee particles to form a highly extractable coffee product of prime quality flavor and aroma.

26. The method of claim 25 wherein steps (a) and (b) are conducted simultaneously by using a blend of low and intermediate quality coffees.

27. The process of claim 25 wherein said flakes have a substantial portion of their coffee cells disrupted.

28. The process of claim 27 wherein said flakes have at least from about 70 to about 85 percent of their coffee cells disrupted.

29. A method for preparing an improved roast coffee product characterized by enhanced extractability and a predominance of the delicate flavor and aroma characteristics of high quality coffee utilizing in predominating proportions flaked roast and ground coffee of low quality variety, said process comprising:
   a. roasting and grinding into particles low quality coffees and thereafter substantially enhancing the extractability of said coffee particles while simultaneously substantially reducing their natural volatile flavor constituents by expelling a substantial portion of the natural flavor-producing constituents normally entrapped therein by compressing said coffee particles into flakes;
   b. roasting and grinding coffee of the high quality variety to form noncompressed coffee particles of unimpaired flavor and aroma; and
   c. admixing said low quality coffee flakes in predominating proportions with said high quality coffee particles to form a highly extractable coffee product of prime quality flavor and aroma.

30. The process of claim 27 wherein said flakes have a substantial portion of their coffee cells disrupted.

31. A process of claim 30 wherein said flakes have at least from about 70 to about 85 percent of their coffee cells disrupted.

32. A method for preparing an improved roast coffee product characterized by enhanced extractability and a predominance of the delicate flavor and aroma characteristics of high quality coffee utilizing in predominating proportions flaked roast and ground coffee of intermediate quality varieties, said process comprising:
   a. roasting grinding into particles intermediate quality coffees and thereafter substantially enhancing the extractability of said coffee particles while simultaneously decreasing their aroma and increasing their natural flavor producing capability by expelling a substantial portion of the natural gases normally entrapped therein by compressing said coffee particles into flakes;
   b. roasting and grinding coffee of the high quality variety to form noncompressed coffee particles of unimpaired flavor and aroma; and
   c. admixing said intermediate quality coffee flakes in predominating proportions with said high quality coffee particles to form a highly extractable coffee product of prime quality flavor and aroma.

33. The process of claim 32 wherein said flakes have at least from about 70 to about 85 percent of their coffee cells disrupted.

34. The process of claim 33 wherein said flakes have at least from about 70 to about 85 percent of their coffee cells disrupted.

35. Roast and ground coffee flakes having a flake bulk density of from 0.38 g./cc. to 0.50 g/cc. a flake thickness of from 0.008 inch to 0.025 inch and a flake moisture content from 0.25 to 7.0 percent.

36. The roast and ground coffee flakes of claim 35 which are undecaffeinated.

37. The roast and ground coffee flakes of claim 35 wherein the bulk density is from 0.42 g./cc. to 0.48 g/cc.

38. The roast and ground coffee flakes of claim 35 wherein the coffee flakes have a flake thickness of from 0.010 inch to 0.016 inch.

39. The roast and ground coffee flakes of claim 35 wherein the coffee flakes have a flake moisture content of from 3.0 to 6.0 percent.

40. The roast and ground coffee flakes of claim 35 wherein the coffee flakes have a color on the Hunter Color "L" scale of from 18 to 23.

41. The roast and ground coffee flakes of claim 40 wherein the coffee flakes have a color on the Hunter Color "L" scale of from 19 to 21.

42. The roast and ground coffee flakes of claim 35 wherein the coffee flakes are further characterized as low grade and/or intermediate grade coffee flakes.

43. The roast and ground coffee flakes of claim 35 wherein the coffee flakes are Robusta coffee flakes.

44. The roast and ground coffee flakes of claim 35 wherein from 3 to 10 percent of said flakes will pass through a 40 mesh U.S. Standard screen.

45. The roast and ground coffee flakes of claim 44 wherein not more than 35 percent of said flakes will remain on a 12 mesh U.S. Standard screen.

46. The roast and ground coffee flakes of claim 35 wherein the coffee flakes are decaffeinated coffee flakes.

* * * * *

UNITED STATES PATENT OFFICE
CERTIFICATE OF CORRECTION

Patent No. 3,615,667       Dated October 26, 1971

Inventor(s) Frederick M. Joffe

It is certified that error appears in the above-identified patent and that said Letters Patent are hereby corrected as shown below:

Col. 1, line 5, insert -- now abandoned -- after "PRODUCT".

line 42, "HOw-" should be -- How- --.

Col. 2, line 13, "aboveH-cited" should be -- above-cited --.

line 25, "major" should be -- minor --.

line 45, insert -- An -- before "additional".

line 58, "aid" should be -- said --.

line 69, "amount" should be -- amounts --.

Col. 3, line 2, "MOre" should be -- More --.

line 5, "if" should be -- is --, and "1.1.1" should be -- 0.1:1 --.

line 12, "arts" should be -- art's --.

line 15, "ans" should be -- and --.

line 41, "HOwever" should be -- However --.

line 51, "natural" should be -- naturals --.

line 53, commas should be inserted after "Republics" and "Ecuador Resacas".

line 67, "Brazil" should be -- Brazilian --.

line 68, delete the period after "Brazilian".

Col. 4, line 1, delete "Brazil" and insert -- others --.

line 34, "ground" should be -- grounds --.

line 37, "or" should be -- of --.

UNITED STATES PATENT OFFICE
CERTIFICATE OF CORRECTION

Patent No. 3,615,667  Dated October 26, 1971

Inventor(s) Frederick M. Joffe

It is certified that error appears in the above-identified patent and that said Letters Patent are hereby corrected as shown below:

Col. 4, line 45, "ration" should be -- ratio --.

Col. 5, line 25, "container" should be -- containers --.

line 37, "10 percent of 30 percent" should be -- 10 percent to 30 percent --.

line 60, insert -- ) -- after "percent".

line 61, insert -- ) -- after "percent".

Col. 6, line 6, after "through a" insert -- 14 mesh Tyler standard sieve, 70 -- line 20, "MOre" should be -- More --.

line 23, "dimension" should be -- dimensions --.

line 25, delete "a", second occurrence.

line 29, "to" should be -- too --.

line 53, "such s" should be -- such as --.

line 68, "a" should be -- any --.

Col. 7, line 24, "of" should be -- or --.

line 52, delete "35" and insert -- angled --.

line 74, "36000" should be -- 3600 --.

Col. 8, line 17, "0.5" should be -- 0.50 --.

line 20, insert -- " -- after "'regular,".

line 21, delete the first pair of quotation marks.

line 33, insert -- is -- before "so".

UNITED STATES PATENT OFFICE
CERTIFICATE OF CORRECTION

Patent No. 3,615,667   Dated October 26, 1971

Inventor(s) Frederick M. Joffe

It is certified that error appears in the above-identified patent and that said Letters Patent are hereby corrected as shown below:

Col. 8, line 37, "MOreover" should be -- Moreover --.

Col. 9, line 6, delete "shaped", second occurrence.

Col. 10, line 34, "strave" should be -- starve --.

line 63, "0.11" should be -- 0.011 --.

line 66, insert -- a -- before "revolving".

Col. 11, line 46, delete "X".

Col. 12, line 22, "EXAMPLE IIIX" should be -- EXAMPLE III --.

Col. 13, line 20, "a" should be -- of --.

line 31, "Lenhman" should be -- Lehman --.

Col. 14, line 9, "form" should be -- from --.

line 14, "3 to 10" should be -- 3% to 10% --.

line 59, "produce" should be -- product --.

line 67, "produce" should be -- product --.

line 71, "Tem's" should be -- TEMS --.

Col. 15, line 31, "unimparied" should be -- unimpaired --.

line 65, "claim 27" should be -- claim 29 --.

Col. 16, line 32, insert a comma after "0.50 g/cc.".

line 34, "0.25" should be -- 2.5% --.

Signed and sealed this 18th day of April 1972.

(SEAL)
Attest:

EDWARD M. FLETCHER, JR.
Attesting Officer

ROBERT GOTTSCHALK
Commissioner of Patents